US007311800B2

(12) United States Patent
Russell et al.

(10) Patent No.: US 7,311,800 B2
(45) Date of Patent: Dec. 25, 2007

(54) DEEP-NESTED EMBOSSED PAPER PRODUCTS

(75) Inventors: Matthew Alan Russell, Middletown, OH (US); Kevin Mitchell Wiwi, West Chester, OH (US); Mark Edwin Forry, Hamilton, OH (US); Ward William Ostendorf, West Chester, OH (US); Michael Gomer Stelljes, Jr., Mason, OH (US); Robert Stanley Ampulski, Fairfield, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 459 days.

(21) Appl. No.: 11/059,986

(22) Filed: Feb. 17, 2005

(65) Prior Publication Data

US 2005/0178513 A1 Aug. 18, 2005

Related U.S. Application Data

(60) Provisional application No. 60/545,329, filed on Feb. 17, 2004.

(51) Int. Cl.

*B31F 1/07* (2006.01)
*D21H 27/30* (2006.01)
*B32B 29/06* (2006.01)

(52) U.S. Cl. ...................... 162/117; 162/109; 162/123; 428/154; 428/174

(58) Field of Classification Search ........ 162/109–117, 162/361, 362, 123, 132, 204, 205; 428/152–156, 428/179, 180, 174, 187; 156/209; 101/3.1; 264/284; 493/58

See application file for complete search history.

(56) References Cited

U.S. PATENT DOCUMENTS

| | | | |
|---|---|---|---|
| 1,863,973 | A | 6/1932 | Ellis, Jr. |
| 3,414,459 | A | 12/1968 | Wells |
| 3,556,907 | A | 1/1971 | Nystrand |
| 3,672,950 | A | 6/1972 | Murphy et al. |
| 3,673,060 | A | 6/1972 | Murphy et al. |

(Continued)

FOREIGN PATENT DOCUMENTS

| | | |
|---|---|---|
| DE | 18 07 842 A1 | 7/1969 |

(Continued)

*Primary Examiner*—Eric Hug
(74) *Attorney, Agent, or Firm*—Peter T. Nguyen; Stephen T. Murphy; Betty J. Zea

(57) ABSTRACT

The present invention relates to embossed tissue-towel paper products comprising one or more plies of tissue paper wherein at least one of the plies of tissue paper comprises a plurality of embossments wherein the at least one embossed plies have a total embossed area less than or equal to about 15% and an average embossment height of at least about 650 μm and E factor of between about 0.0150 to about 1.0000 inches$^4$ per number of embossments.

16 Claims, 3 Drawing Sheets

U.S. PATENT DOCUMENTS

| | | | |
|---|---|---|---|
| 3,684,603 A | 8/1972 | Iltis | |
| 3,708,366 A | 1/1973 | Donnelly | |
| 3,867,225 A | 2/1975 | Nystrand | |
| 4,135,024 A | 1/1979 | Callahan | |
| 4,320,162 A | 3/1982 | Schulz | |
| 4,325,773 A | 4/1982 | Schulz | |
| 4,326,002 A | 4/1982 | Schulz | |
| 4,610,743 A | 9/1986 | Salmeen et al. | |
| 4,759,967 A | 7/1988 | Bauernfeind | |
| 4,913,911 A | 4/1990 | Wildt | |
| 4,921,034 A | 5/1990 | Burgess et al. | |
| 4,927,588 A | 5/1990 | Schulz | |
| 5,158,819 A | 10/1992 | Goodman, Jr. et al. | |
| 5,173,351 A | 12/1992 | Ruppel et al. | |
| 5,294,475 A | 3/1994 | McNeil | |
| 5,339,730 A | 8/1994 | Ruppel et al. | |
| 5,409,572 A | 4/1995 | Kershaw et al. | |
| 5,436,057 A | 7/1995 | Schulz | |
| 5,468,323 A | 11/1995 | McNeil | |
| 5,490,902 A | 2/1996 | Schulz | |
| 5,529,563 A | 6/1996 | Veith et al. | |
| 5,536,506 A | 7/1996 | Majeed et al. | |
| 5,573,830 A | 11/1996 | Schulz | |
| 5,597,639 A | 1/1997 | Schulz | |
| 5,620,776 A | 4/1997 | Schulz | |
| 5,620,779 A | 4/1997 | Levy et al. | |
| 5,779,965 A | 7/1998 | Beuther et al. | |
| 5,840,404 A | 11/1998 | Graff et al. | |
| 5,846,636 A | 12/1998 | Ruppel et al. | |
| 5,868,168 A | 2/1999 | Mott et al. | |
| 5,874,156 A | 2/1999 | Schulz | |
| 5,904,812 A | 5/1999 | Salman et al. | |
| 6,077,390 A | 6/2000 | Salman et al. | |
| 6,077,590 A | 6/2000 | Archer et al. | |
| 6,106,928 A | 8/2000 | Laurent et al. | |
| 6,113,723 A | 9/2000 | McNeil et al. | |
| 6,129,815 A | 10/2000 | Larson et al. | |
| 6,129,972 A | 10/2000 | McNeil et al. | |
| 6,165,319 A | 12/2000 | Heath et al. | |
| 6,299,729 B1 | 10/2001 | Heath et al. | |
| 6,331,228 B1 | 12/2001 | Heath et al. | |
| 6,344,111 B1 | 2/2002 | Wilhelm | |
| 6,348,131 B1 * | 2/2002 | Kershaw et al. | 162/112 |
| 6,361,308 B2 | 3/2002 | Wendler, Jr. | |
| 6,468,392 B2 | 10/2002 | Oriarian et al. | |
| 6,524,683 B1 | 2/2003 | Roussel et al. | |
| 6,571,673 B2 | 6/2003 | Piazza | |
| 6,602,577 B1 * | 8/2003 | Ostendorf et al. | 428/156 |
| 6,649,024 B2 | 11/2003 | Oriaran et al. | |
| 6,699,360 B2 | 3/2004 | Heath et al. | |
| 6,733,626 B2 | 5/2004 | Ruthven et al. | |
| 6,755,928 B1 | 6/2004 | Biagiotti | |
| 6,802,937 B2 | 10/2004 | Johnston et al. | |
| 6,887,349 B2 | 5/2005 | Ruthven et al. | |
| 6,911,573 B2 | 6/2005 | Chen et al. | |
| 2003/0111169 A1 | 6/2003 | Baggot et al. | |
| 2003/0192662 A1 | 10/2003 | Heath et al. | |
| 2003/0228444 A1 * | 12/2003 | Johnston et al. | 428/156 |
| 2004/0038006 A1 | 2/2004 | Biagiotti | |
| 2004/0163783 A1 | 8/2004 | Muller | |
| 2004/0166290 A1 | 8/2004 | Sembritzki et al. | |
| 2004/0209050 A1 | 10/2004 | Andersson | |
| 2004/0231813 A1 | 11/2004 | Basler et al. | |
| 2004/0247836 A1 | 12/2004 | Biagiotti | |
| 2005/0092881 A1 | 5/2005 | Schulz et al. | |
| 2005/0098281 A1 | 5/2005 | Schulz et al. | |

FOREIGN PATENT DOCUMENTS

| | | |
|---|---|---|
| EP | 1 312 466 A1 | 5/2003 |
| EP | 1 232 854 B1 | 4/2005 |
| GB | 2 377 674 A1 | 1/2003 |
| WO | WO 94/06623 | 3/1994 |
| WO | WO 98/50481 | 11/1998 |
| WO | WO 00/73053 | 12/2000 |
| WO | WO 03/031170 | 4/2003 |
| WO | WO 03/072344 | 9/2003 |

* cited by examiner

DEEP-NESTED EMBOSSED PAPER PRODUCTS

CROSS REFERENCE TO RELATED APPLICATIONS

This application claims the benefit of U.S. Provisional Application No. 60/545,329, filed Feb. 17, 2004.

FIELD OF THE INVENTION

The present invention relates to deep nested embossed paper products having larger embossing spacing.

BACKGROUND OF THE INVENTION

The embossing of paper products to make those products more absorbent, softer and bulkier, over unembossed products, is well known in the art. Embossing technology has included pin-to-pin embossing where protrusions on the respective embossing rolls are matched such that the tops of the protrusion contact each other through the paper product, thereby compressing the fibrous structure of the product. The technology has also included male-female embossing, or nested embossing, where protrusions of one or both rolls are aligned with either a non-protrusion area or a female recession in the other roll. U.S. Pat. No. 4,921,034, issued to Burgess et al. on May 1, 1990 provides additional background on embossing technologies.

Deep nested embossing of multiply tissue products is taught in U.S. Pat. No. 5,686,168 issued to Laurent et al. on Nov. 11, 1997; and U.S. Pat. No. 5,294,475 issued to McNeil on Mar. 15, 1994. While these technologies have been useful in improving the embossing efficiency and glue bonding of these multiply tissues, manufacturers have observed that when producing certain deep nested embossed patterns the resulting tissue paper is less soft and less absorbent than expected. As expected, tissue products having these less than desirable softness and absorbency detract significantly from the acceptance of the product despite the improved aesthetic impression of the deep nested embossing.

It has been found that certain selected embossing patterns allow for deep nested embossing while improving tissue softness and absorbency.

SUMMARY OF THE INVENTION

The present invention relates to embossed tissue-towel paper products comprising one or more plies of tissue paper wherein at least one of the plies of tissue paper comprises a plurality of embossments wherein the at least one embossed plies have a total embossed area less than or equal to about 15% and an average embossment height of at least about 650 μm and E factor of between about 0.0150 to about 1.0000 inches$^4$ per number of embossments.

DETAILED DESCRIPTION OF THE INVENTION

Figure 1:
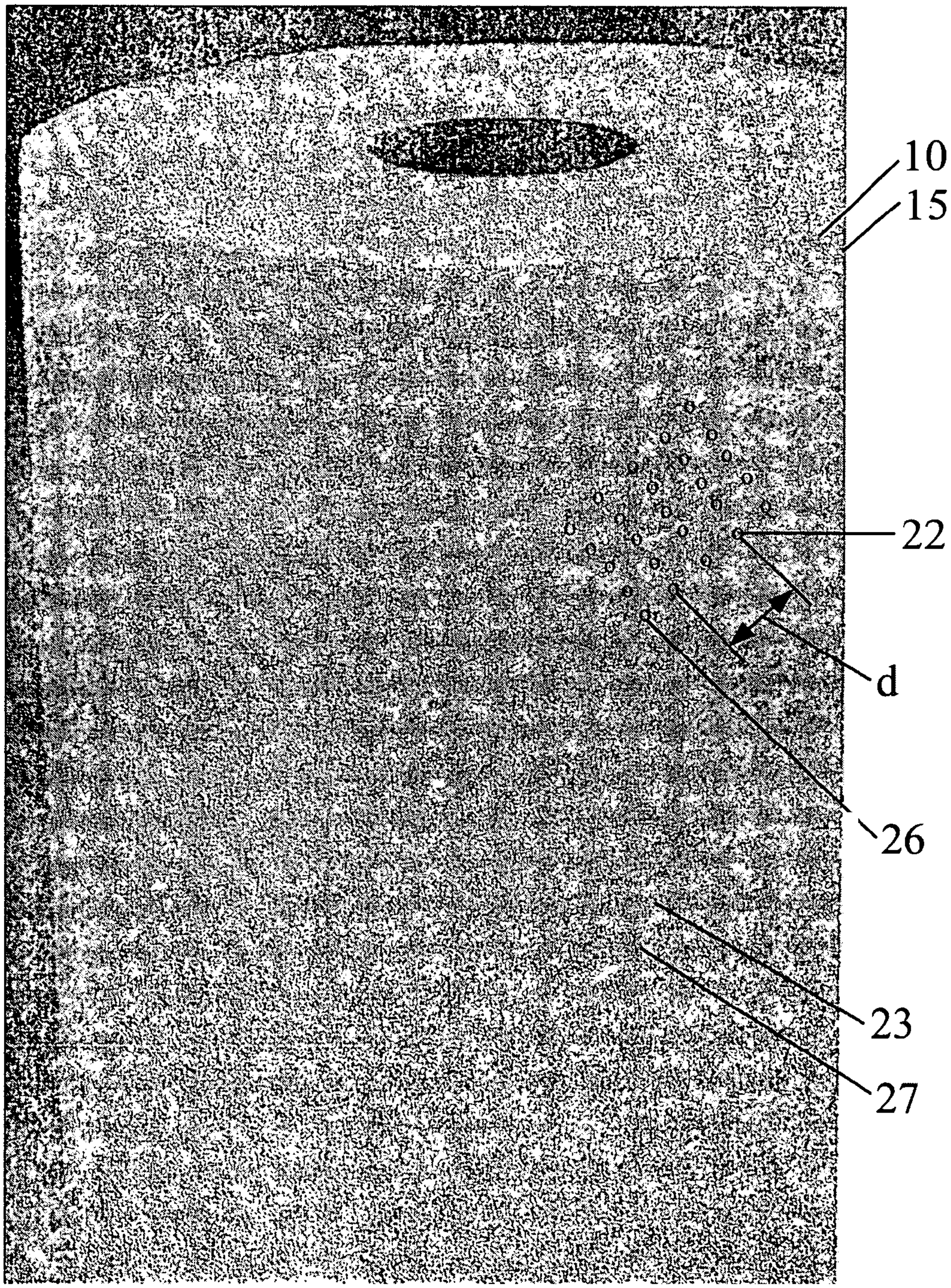
FIG. 1 is a photograph of a tissue-towel product showing a view of a prior art deep nested emboss pattern.

The present invention relates to embossed tissue-towel paper products 10 comprising one or more plies of tissue paper 15 wherein at least one of the plies of tissue paper comprises a plurality of embossments 20 wherein the at least one embossed plies have a total embossed area less than or equal to about 15% and an average embossment height of at least about 650 μm and E factor of between about 0.0150 to about 1.0000 inches$^4$ per number of embossments.

The term "absorbent capacity" and "absorbency" means the characteristic of a ply or multiple ply product of the fibrous structure which allows it to take up and retain fluids, particularly water and aqueous solutions and suspensions. In evaluating the absorbency of paper, not only is the absolute quantity of fluid a given amount of paper will hold significant, but the rate at which the paper will absorb the fluid is also. Absorbency is measured here in by the Horizontal Full Sheet (HFS) test method described in the Test Methods section herein.

The term "machine direction" is a term of art used to define the dimension on the processed web of material parallel to the direction of travel that the web takes through the papermaking, printing, and embossing machines. Similarly, the term "cross direction" or "cross-machine direction" refers to the dimension on the web perpendicular to the direction of travel through the papermaking, printing, and embossing machines.

As used herein, the phrase "tissue-towel paper product" refers to products comprising paper tissue or paper towel technology in general, including but not limited to conventionally felt-pressed or conventional wet pressed tissue paper; pattern densified tissue paper; and high-bulk, uncompacted tissue paper. Non-limiting examples of tissue-towel paper products include toweling, facial tissue, bath tissue, and table napkins and the like.

The term "ply" as used herein means an individual sheet of fibrous structure having the use as a tissue product. As used herein, the ply may comprise one or more wet-laid layers. When more than one wet-laid layer is used, it is not necessary that they are made from the same fibrous structure. Further, the layers may or may not be homogeneous within the layer. The actual make up of the tissue paper ply is determined by the desired benefits of the final tissue-towel paper product.

The term "fibrous structure" as used herein means an arrangement or fibers produced in any typical papermaking machine known in the art to create the ply of tissue-towel paper. "Fiber" as used herein means an elongated particulate having an apparent length greatly exceeding its apparent width, i.e. a length to diameter ratio of at least about 10. More specifically, as used herein, "fiber" refers to papermaking fibers. The present invention contemplates the use of a variety of papermaking fibers, such as, for example, natural fibers or synthetic fibers, or any other suitable fibers, and any combination thereof. Papermaking fibers useful in the present invention include cellulosic fibers commonly known as wood pulp fibers. Applicable wood pulps include chemical pulps, such as Kraft, sulfite, and sulfate pulps, as well as mechanical pulps including, for example, groundwood, thermomechanical pulp and chemically modified thermomechanical pulp. Chemical pulps, however, may be preferred since they impart a superior tactile sense of softness to tissue sheets made therefrom. Pulps derived from both deciduous trees (hereinafter, also referred to as "hardwood") and coniferous trees (hereinafter, also referred to as "softwood") may be utilized. The hardwood and softwood fibers can be blended, or alternatively, can be deposited in layers to provide a stratified web. U.S. Pat. No. 4,300,981 and U.S. Pat. No. 3,994,771 disclose layering of hardwood and softwood fibers. Also applicable to the present invention are fibers derived from recycled paper, which may contain any or all of the above categories as well as other non-fibrous materials such as fillers and adhesives used to facilitate the original papermaking. In addition to the above, fibers and/or filaments made from polymers, specifically hydroxyl polymers may be used in the present invention. Nonlimiting examples of suitable hydroxyl polymers include polyvinyl alcohol, starch, starch derivatives, chitosan, chitosan derivatives, cellulose derivatives, gums, arabinans, galactans and mixtures thereof.

The tissue-towel paper product substrate may comprise any tissue-towel paper product known in the industry. Embodiment of these substrates may be made according U.S. Pat. No. 4,191,609 issued Mar. 4, 1980 to Trokhan; U.S. Pat. No. 4,300,981 issued to Carstens on Nov. 17, 1981; U.S. Pat. No. 4,191,609 issued to Trokhan on Mar. 4, 1980; U.S. Pat. No. 4,514,345 issued to Johnson et al. on Apr. 30, 1985; U.S. Pat. No. 4,528,239 issued to Trokhan on Jul. 9, 1985; U.S. Pat. No. 4,529,480 issued to Trokhan on Jul. 16, 1985; U.S. Pat. No. 4,637,859 issued to Trokhan on Jan. 20, 1987; 5,245,025 issued to Trokhan et al. on Sep. 14, 1993; U.S. Pat. No. 5,275,700 issued to Trokhan on Jan. 4, 1994; U.S. Pat. No. 5,328,565 issued to Rasch et al. on Jul. 12, 1994; U.S. Pat. No. 5,334,289 issued to Trokhan et al. on Aug. 2, 1994; U.S. Pat. No. 5,364,504 issued to Smurkowski et al. on Nov. 15, 1995; U.S. Pat. No. 5,527,428 issued to Trokhan et al. on Jun. 18, 1996; U.S. Pat. No. 5,556,509 issued to Trokhan et al. on Sep. 17, 1996; U.S. Pat. No. 5,628,876 issued to Ayers et al. on May 13, 1997; U.S. Pat. No. 5,629,052 issued to Trokhan et al. on May 13, 1997; U.S. Pat. No. 5,637,194 issued to Ampulski et al. on Jun. 10, 1997; U.S. Pat. No. 5,411,636 issued to Hermans et al. on May 2, 1995; EP 677612 published in the name of Wendt et al. on Oct. 18, 1995.

Preferred tissue-towel substrates may be through-air-dried or conventionally dried. Optionally, it may be foreshortened by creping or by wet microcontraction. Creping and/or wet microcontraction are disclosed in commonly assigned U.S. Pat. No. 6,048,938 issued to Neal et al. on Apr. 11, 2000; U.S. Pat. No. 5,942,085 issued to Neal et al. on Aug. 24, 1999; U.S. Pat. No. 5,865,950 issued to Vinson et al. on Feb. 2, 1999; U.S. Pat. No. 4,440,597 issued to Wells et al. on Apr. 3, 1984; U.S. Pat. No. 4,191,756 issued to Sawdai on May 4, 1980; and U.S. Ser. No. 09/042,936 filed Mar. 17, 1998.

Conventionally pressed tissue paper and methods for making such paper are known in the art. See commonly assigned U.S. patent application Ser. No. 09/997,950 filed Nov. 30, 2001. One preferred tissue paper is pattern densified tissue paper which is characterized by having a relatively high-bulk field of relatively low fiber density and an array of densified zones of relatively high fiber density. The high-bulk field is alternatively characterized as a field of pillow regions. The densified zones are alternatively referred to as knuckle regions. The densified zones may be discretely spaced within the high-bulk field or may be interconnected, either fully or partially, within the high-bulk field. Preferred processes for making pattern densified tissue webs are disclosed in U.S. Pat. No. 3,301,746, issued to Sanford and Sisson on Jan. 31, 1967, U.S. Pat. No. 3,974,025, issued to Ayers on Aug. 10, 1976, U.S. Pat. No. 4,191,609, issued to on Mar. 4, 1980, and U.S. Pat. No. 4,637,859, issued to on Jan. 20, 1987; U.S. Pat. No. 3,301,746, issued to Sanford and Sisson on Jan. 31, 1967, U.S. Pat. No. 3,821,068, issued to Salvucci, Jr. et al. on May 21, 1974, U.S. Pat. No. 3,974,025, issued to Ayers on Aug. 10, 1976, U.S. Pat. No. 3,573,164, issued to Friedberg, et al. on Mar. 30, 1971, U.S. Pat. No. 3,473,576, issued to Amneus on Oct. 21, 1969, U.S. Pat. No. 4,239,065, issued to Trokhan on Dec. 16, 1980, and U.S. Pat. 4,528,239, issued to Trokhan on Jul. 9, 1985.

Uncompacted, non pattern-densified tissue paper structures are also contemplated within the scope of the present invention and are described in U.S. Pat. No. 3,812,000 issued to Joseph L. Salvucci, Jr. and Peter N. Yiannos on May 21, 1974, and U.S. Pat. 4,208,459, issued to Henry E. Becker, Albert L. McConnell, and Richard Schutte on Jun. 17, 1980.

Uncreped tissue paper, a term as used herein, refers to tissue paper which is non-compressively dried, most preferably by through air drying. Resultant through air dried webs are pattern densified such that zones of relatively high density are dispersed within a high bulk field, including pattern densified tissue wherein zones of relatively high density are continuous and the high bulk field is discrete. The techniques to produce uncreped tissue in this manner are taught in the prior art. For example, Wendt, et. al. in European Patent Application 0 677 612A2, published Oct. 18, 1995; Hyland, et. al. in European Patent Application 0 617 164 A1, published Sep. 28, 1994; and Farrington, et. al. in U.S. Pat. No. 5,656,132 published Aug. 12, 1997.

The papermaking fibers utilized for the present invention will normally include fibers derived from wood pulp. Other cellulosic fibrous pulp fibers, such as cotton linters, bagasse, etc., can be utilized and are intended to be within the scope of this invention. Synthetic fibers, such as rayon, polyethylene and polypropylene fibers, may also be utilized in combination with natural cellulosic fibers. One exemplary polyethylene fiber which may be utilized is Pulpex®, available from Hercules, Inc. (Wilmington, Del.).

Applicable wood pulps include chemical pulps, such as Kraft, sulfite, and sulfate pulps, as well as mechanical pulps including, for example, groundwood, thermomechanical pulp and chemically modified thermomechanical pulp. Chemical pulps, however, are preferred since they impart a superior tactile sense of softness to tissue sheets made therefrom. Pulps derived from both deciduous trees (hereinafter, also referred to as "hardwood") and coniferous trees (hereinafter, also referred to as "softwood") may be utilized. Also applicable to the present invention are fibers derived from recycled paper, which may contain any or all of the above categories as well as other non-fibrous materials such as fillers and adhesives used to facilitate the original papermaking.

Other materials can be added to the aqueous papermaking furnish or the embryonic web to impart other desirable characteristics to the product or improve the papermaking process so long as they are compatible with the chemistry of the softening composition and do not significantly and adversely affect the softness or strength character of the present invention. The following materials are expressly included, but their inclusion is not offered to be all-inclusive. Other materials can be included as well so long as they do not interfere or counteract the advantages of the present invention.

It is common to add a cationic charge biasing species to the papermaking process to control the zeta potential of the aqueous papermaking furnish as it is delivered to the papermaking process. These materials are used because most of the solids in nature have negative surface charges, including the surfaces of cellulosic fibers and fines and most inorganic fillers. One traditionally used cationic charge biasing species is alum. More recently in the art, charge biasing is done by use of relatively low molecular weight cationic synthetic polymers preferably having a molecular weight of no more than about 500,000 and more preferably no more than about 200,000, or even about 100,000. The charge densities of such low molecular weight cationic synthetic polymers are relatively high. These charge densities range from about 4 to about 8 equivalents of cationic nitrogen per kilogram of polymer. An exemplary material is Cypro 514®, a product of Cytec, Inc. of Stamford, Conn. The use of such materials is expressly allowed within the practice of the present invention.

The use of high surface area, high anionic charge microparticles for the purposes of improving formation, drainage, strength, and retention is taught in the art. See, for example, U.S. Pat. No. 5,221,435, issued to Smith on Jun. 22, 1993, the disclosure of which is incorporated herein by reference.

If permanent wet strength is desired, cationic wet strength resins can be added to the papermaking furnish or to the embryonic web. Suitable types of such resins are described in U.S. Pat. No. 3,700,623, issued on Oct. 24, 1972, and U.S. Pat. No. 3,772,076, issued on Nov. 13, 1973, both to Keim.

Many paper products must have limited strength when wet because of the need to dispose of them through toilets into septic or sewer systems. If wet strength is imparted to these products, fugitive wet strength, characterized by a decay of part or all of the initial strength upon standing in presence of water, is preferred. If fugitive wet strength is desired, the binder materials can be chosen from the group consisting of dialdehyde starch or other resins with aldehyde functionality such as Co-Bond 1000® offered by National Starch and Chemical Company of Scarborough, Me.; Parez 750® offered by Cytec of Stamford, Conn.; and the resin described in U.S. Pat. No. 4,981,557, issued on Jan. 1, 1991, to Bjorkquist, and other such resins having the decay properties described above as may be known to the art.

If enhanced absorbency is needed, surfactants may be used to treat the tissue paper webs of the present invention. The level of surfactant, if used, is preferably from about 0.01% to about 2.0% by weight, based on the dry fiber weight of the tissue web. The surfactants preferably have alkyl chains with eight or more carbon atoms. Exemplary anionic surfactants include linear alkyl sulfonates and alkylbenzene sulfonates. Exemplary nonionic surfactants include alkylglycosides including alkylglycoside esters such as Crodesta SL40® which is available from Croda, Inc. (New York, N.Y.); alkylglycoside ethers as described in U.S. Pat. No. 4,011,389, issued to Langdon, et al. on Mar. 8, 1977; and alkylpolyethoxylated esters such as Pegosperse 200 ML available from Glyco Chemicals, Inc. (Greenwich, Conn.) and IGEPAL RC-520® available from Rhone Poulenc Corporation (Cranbury, N.J.). Alternatively, cationic softener active ingredients with a high degree of unsaturated (mono and/or poly) and/or branched chain alkyl groups can greatly enhance absorbency.

In addition, other chemical softening agents may be used. Preferred chemical softening agents comprise quaternary ammonium compounds including, but not limited to, the well-known dialkyldimethylamnmonium salts (e.g., ditallowdimethylammonium chloride, ditallowdimethylammonium methyl sulfate, di(hydrogenated tallow)dimethyl ammonium chloride, etc.). Particularly preferred variants of these softening agents include mono or diester variations of the before mentioned dialkyldimethylammonium salts and ester quaternaries made from the reaction of fatty acid and either methyl diethanol amine and/or triethanol amine, followed by quaternization with methyl chloride or dimethyl sulfate. Another class of papermaking-added chemical softening agents comprise the well-known organo-reactive polydimethyl siloxane ingredients, including the most preferred amino functional polydimethyl siloxane.

Filler materials may also be incorporated into the tissue papers of the present invention. U.S. Pat. No. 5,611,890, issued to Vinson et al. on Mar. 18, 1997, and, incorporated herein by reference discloses filled tissue-towel paper products that are acceptable as substrates for the present invention.

The above listings of optional chemical additives is intended to be merely exemplary in nature, and are not meant to limit the scope of the invention.

Another class of preferred substrate for use in the process of the present invention is non-woven webs comprising synthetic fibers. Examples of such substrates include but are not limited to textiles (e.g.; woven and non woven fabrics and the like), other non-woven substrates, and paperlike products comprising synthetic or multicomponent fibers. Representative examples of other preferred substrates can be found in U.S. Pat. No. 4,629,643 issued to Curro et al. on Dec. 16, 1986; U.S. Pat. No. 4,609,518 issued to Curro et al. on Sep. 2, 1986; European Patent Application EP A 112 654 filed in the name of Haq; copending U.S. patent application Ser. No. 10/360038 filed on Feb. 6, 2003 in the name of Trokhan et al.; copending U.S. patent application Ser. No. 10/360021 filed on Feb. 6, 2003 in the name of Trokhan et al.; copending U.S. patent application Ser. No. 10/192,372 filed in the name of Zink et al. on Jul. 10, 2002; and copending U.S. patent application Ser. No. 09/089,356 filed in the name of Curro et al. on Dec. 20. 2000.

The embossed tissue-towel paper product of the present invention may comprise one or more plies of tissue paper, preferably two or more plies. Where the embossed paper product comprises two or more plies of tissue structure, the plies may be the same substrate respectively or the plies may comprise different substrates combined to create desired consumer benefits. Some preferred embodiments of present invention comprise two plies of tissue substrate. Another preferred embodiment of the present invention comprises a first outer ply, a second outer ply, and at least one inner ply.

The embossed product of the present invention may comprise one ply of deep nested embossed substrate, more than one plies which are combined and then embossed together in a deep nested embossed process, or more than one ply where one or more of the plies is deep nested embossed and then subsequently combined with other plies. One example of the latter combination is an embossed tissue-towel paper product comprising more than one ply where the first and second outer plies are deep-nested embossed and subsequently combined with one or more inner plies of tissue substrate.

Figure 4:
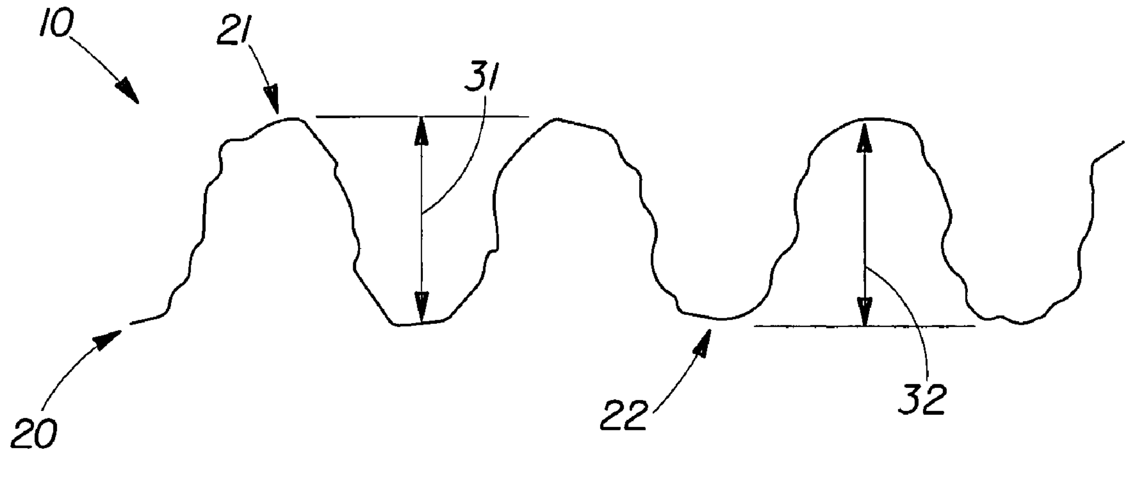
FIG. 4 is a side view of the gap between two engaged emboss rolls of a deep nested embossing process.

All of the embodiments of the present invention are embossed by any deep nested embossed technology known in the industry. The one or more plies of tissue paper structure are embossed, either together or individually, in a deep nested embossing process represented in FIG. 4. The tissue ply structure 10 is embossed in the gap 50 between two embossing rolls, 100 and 200. The embossing rolls may be made from any material known for making such rolls, including without limitation steel, rubber, elastomeric materials, and combinations thereof. Each embossing roll 100 and 200 have a combination of emboss knobs 110 and 210 and gaps 120 and 220. Each emboss know has a knob base 140 and a knob face 150. The surface pattern of the rolls, that is the design of the various knobs and gaps, may be any design desired for the product, however for the deep nested process the roll designs must be matched such that the knob face of one roll 130 extends into the gap of the other roll beyond the knob face of the other roll 230 creating a depth of engagement 300. The depth of engagement is the distance between the nested knob faces 130 and 230. The depth of the engagement 300 used in producing the paper products of the present invention can range from about 0.04 inch to about 0.08 inch, and preferably from about 0.05 inch to about 0.07 inch such that an embossed height of at least about 650 μm, preferably at least about 1000 μm, more preferably at least about 1250 μm, and most preferably at least about 1400 μm is formed in both surfaces of the fibrous structure of the one-ply tissue-towel product.

Figure 2:
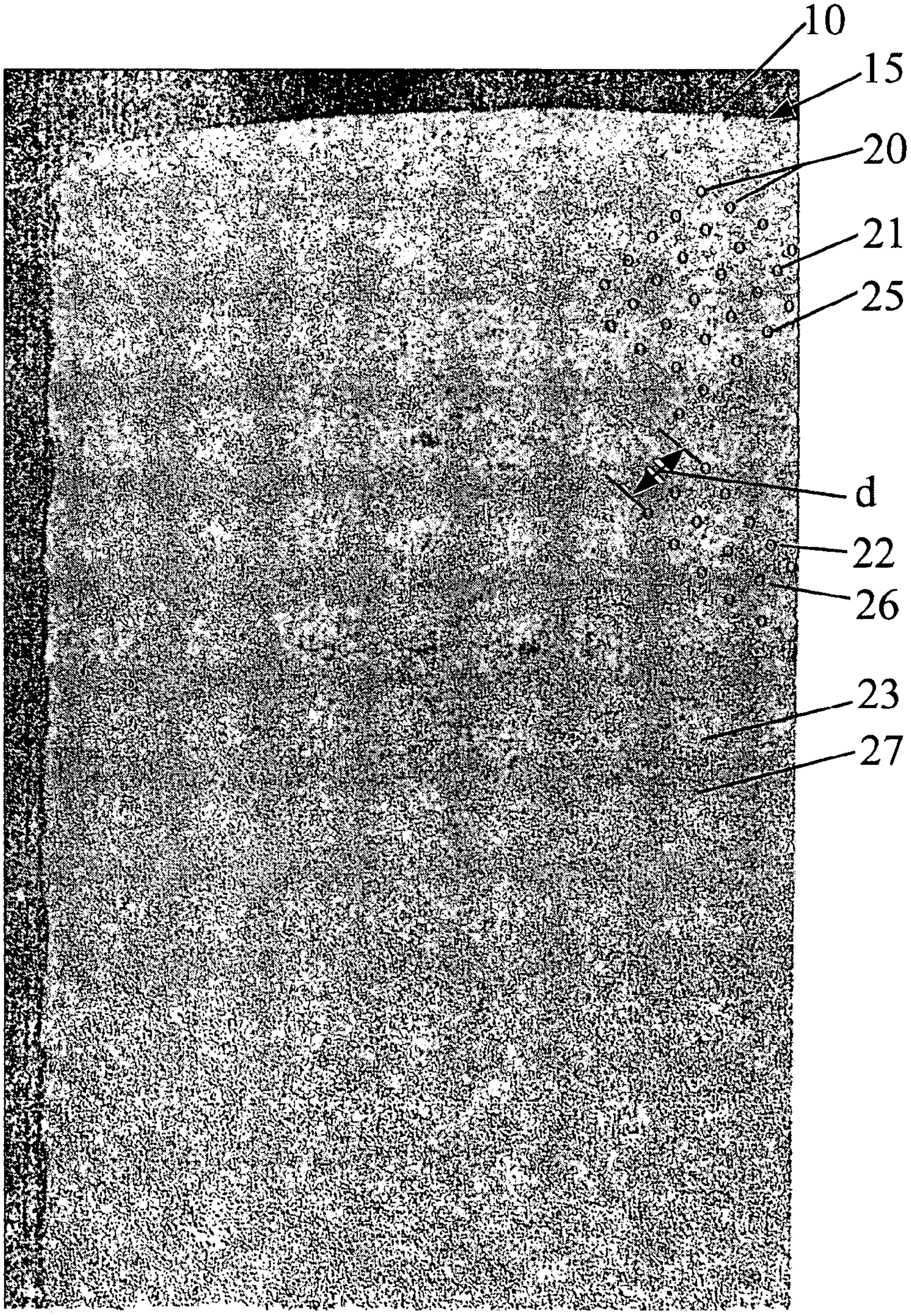
FIG. 2 is a photograph of a tissue-towel product showing a view of a deep nested emboss pattern of the present invention.
Figure 3:
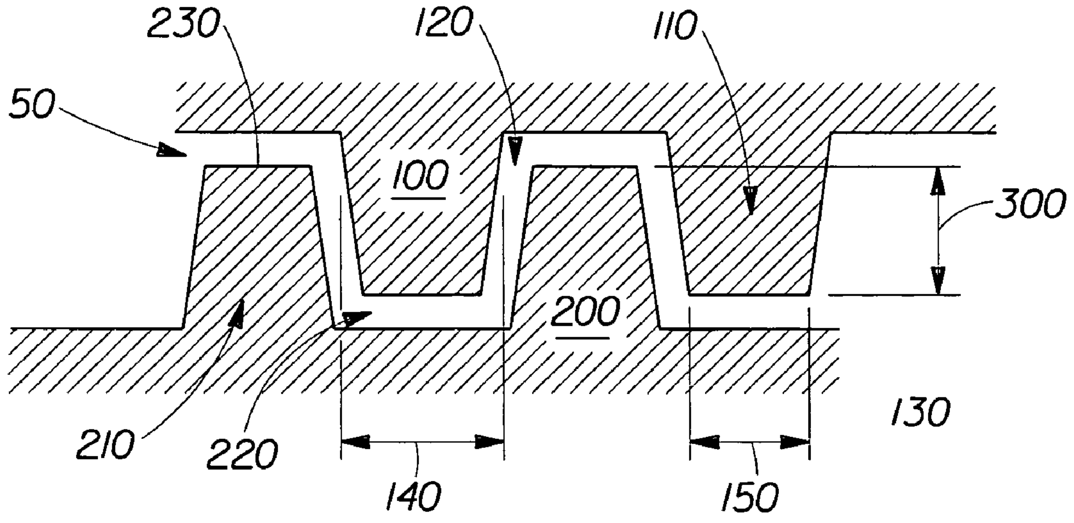
FIG. 3 is a side view of an embodiment of the embossed tissue-towel paper product of the present invention.

Referring to FIGS. 2 and 3, the plurality of embossments 20 of the embossed tissue paper product 10 of the present invention may optionally be configured in a non-random pattern of positive embossments 23 and a corresponding non-random pattern of negative embossments 27. As used herein "positive embossments" are embossments which protrude toward the viewer when the embossed product is viewed from above one surface. Conversely, "negative embossments" are embossments which push away from the viewer.

The embossed tissue-towel paper product 10 comprises one or more plies of tissue structure 15, wherein at least one of the plies comprises a plurality of embossments 20. The ply or plies which are embossed are embossed in a deep nested embossing process such that the first surface 21 exhibits an embossment height 31 of at least about 650 μm, preferably at least 1000 μm, more preferably at least about 1250 μm, and most preferably at least about 1400 μm. The embossment height 31 of the tissue-towel paper product is measured by the Embossment Height Test method using a GFM Primos Optical Profiler as described in the Test Methods herein.

The positive and negative non-random patterns, 23 and 27 respectfully, may comprise at least one non-random curvilinear sub-pattern 22 or 26. The sub-patterns may comprise one continuous element or a plurality of discrete element arranged in a curvilinear sub-pattern. In preferred embodiments of the present invention both the positive and negative patterns comprise at least one non-random curvilinear pattern 22 and 26. Especially preferred is where the positive and negative non-random patterns correspond to one another, such that the respective patterns run along side one another thereby accentuating the deep-nested embossing pattern.

The tissue paper product 10 of the present invention will have a total embossed area of about 15% or less, preferably about 10% or less, and most preferably about 8% or less. By embossed area as used herein, it is meant the area of the paper structure that is directly compressed by either the positive or the negative embossing knobs. The paper structure may be deflected between these knobs, but this deflection is not considered part of the embossed area.

The present invention defines a relationship between the size dimension (i.e.; area) of the individual embossments 20 and the total number of embossments 20 (i.e.; embossment frequency) per unit area of paper. This relationship, known as the E factor, is defined as follows:

$$E=S/N\times 100$$

wherein E is the "E factor", S is the average area of the individual embossment, N is the number of embossments per unit area of paper. The paper 10 of the present invention will have between about 5 to 25 embossments per square inch of paper (i.e.; 0.775 to 3.875 embossments per square centimeter of paper). The paper 10 of the present invention will have an E factor of between about 0.0100 to 3 inches$^4$/number of embossments (i.e.; about 0.416 to 125 cm$^4$/number of embossments), preferably between about 0.0125 to 2 inches$^4$/number of embossments (i.e.; about 0.520 to 83.324 cm$^4$/number of embossments), and most preferably between about 0.0150 to 1 inches$^4$/number of embossments (i.e.; about 0.624 to 41.62 cm$^4$/number of embossments).

Embossments 20 are often based on standard plane geometry shapes such as circles, ovals, various quadrilaterals and the like, both alone and in combination. For such plane geometry figures, the area of an individual embossment 20 can be readily derived from well known mathematical formulas. For more complex shapes, various area calculation methods may be used. One such technique follows. Start with an image of a single embossment 20 at a known magnification of the original (for example 100×) on an otherwise clean sheet of paper, cardboard or the like. Calculate the area of the paper and weigh it. Cut out the image of the embossment 20 and weigh it. With the known weight and size of the whole paper, and the known weight and magnification of the embossment image, the area of the actual embossment 20 may be calculated as follows:

$$\text{Embossment area}=((\text{embossment image weight}/\text{paper weight})\times\text{paper area})/\text{magnification}^2$$

Embossments 20 are usually arranged in a repeating pattern. The number of embossments 20 per square area can readily be determined as follows. Select an area of the pattern that is inclusive of at least 4 pattern repeats. Measure this area and count the number of embossments 20. The "embossment frequency" is calculated by dividing the number of embossments 20 by the area selected.

The percent total embossed area of the paper is determined by multiplying the area of the individual embossment by the number of embossments per unit area of paper and multiplying this product×100 (i.e.; (S×N)×100).

In preferred embodiments of the present invention, the non-random pattern of positive embossments 23 comprises more than one corresponding curvilinear sub-pattern 22. The distance, d, between the positive sub-patterns 22 in these preferred embodiments may be greater than or equal to about 0.25 inch, preferably greater than about 0.3 inch and more preferably greater than about 0.35 inch. The distance, d, between the positive sub-patterns 22 may be less than about 1.0 inch, preferably less than about 0.75 inch and more preferably less than about 0.5 inch. Especially preferred embodiments of the present invention also comprise a corresponding non-random pattern of negative embossments 27 comprising at least one negative curvilinear sub-pattern 26 located between the positive sub-patterns 22 of embossments 20.

The embossed tissue-towel paper products 10 of the present invention provide a surprising softness and absorbency improvement over previous deep nested embossed products. FIG. 1 shows a prior art deep nested tissue paper product. The prior art comprises embossments in a pattern of embossments having an emboss frequency of 58.24 per square inch and having an embossed area of 0.00347 square inch. Therefore, the prior art product has an E-factor of 0.0053. The distance, d, between the positive sub-patterns is 0.2489 inch. Without being limited by theory, it is believed that prior deep nested emboss patterns, where high embossment frequency resulted in the embossments being too closely spaced together and thereby giving E factors less than 0.015 inches$^4$/number of embossments, such that the tissue paper substrates are stretched too far beyond its plastic deformation point, forming a more rigid three dimensional structure around the embossing knobs. The structure may have been deformed such that the void space in the fibrous structure collapsed as the structure was pulled between the embossing knobs.

It is believed that the deep-nested embossed structures of the present invention, having a higher E-factor, provides embossing which does not stress the fibrous substrate so far as to compress the void space, but still forms a stable emboss structure. The resulting embossed tissue-towel paper products are softer than prior deep nested embossed products. Softness may be measured by measures of compressibility of the products.

One measure of compressibility is determining the ratio of the Embossment Height over the Loaded Caliper of the products. The Loaded Caliper measures the effective thickness of the product as measured under a given load and is determined by the Loaded Caliper test described in the Test Methods. The ratio is calculated by taking the Embossment Height in μm and dividing it by the Loaded caliper. Note that caliper is measured in mils and must be converted to μm.

Ratio=Embossment Height (μm)/(Loaded Caliper (mils)*25.4 μm/mil).

The higher the Embossment Height to Loaded Caliper ratio is the more compressible and therefore the softer the paper product feels to consumers. The Embossment Height to Loaded Caliper Ratio of the Prior Art deep nested paper product measured 1.416. The embossed tissue-towel paper products have an Embossment Height to Loaded Caliper Ratio of greater than about 1.45, preferably greater than about 1.60, and more preferably greater than about 1.80 and the ratio is less than about 3.50, preferably less than about 3.00, and more preferably less than about 2.50.

Another measure of compressibility may be the measurement of the Initial Compression Ratio. The Initial Compression Ratio is the slope of a curve of the depression in thickness plotted against the log(10) of an applied load taken as the load goes to zero (log of the load goes to one). The Initial Compression Ratio is determined by the method described in the test methods. The Initial Compression Ratio of the prior art deep nested paper product ranges from 15 to 22. The embossed tissue-towel paper products of the present invention have an Initial Compression Ratio greater than about 25, preferably greater than 30, more preferably greater than 35, and most preferably greater than 40.

The embossing pattern of the present invention also provides increased absorbency or Absorbent Capacity. The Absorbent Capacity of the prior art deep nested paper products have absorbent capacity less than or equal to 21.2 gram per gram. The embossed tissue-towel paper products of the present invention have an Absorbent Capacity of greater than about 21.3, preferably greater than about 21.5, more preferably greater than about 22.0, and most preferably greater than about 23.0 grams per gram.

EMBODIMENTS

Embodiment 1

One fibrous structure useful in achieving the embossed tissue-towel paper product is the through-air dried (TAD), differential density structure described in U.S. Pat. No. 4,528,239. Such a structure may be formed by the following process.

A pilot scale Fourdrinier, through-air-dried papermaking machine is used in the practice of this invention. A slurry of papermaking fibers is pumped to the headbox at a consistency of about 0.15%. The slurry consists of about 65% Northern Softwood Kraft fibers and about 35% unrefined Southern Softwood Kraft fibers. The fiber slurry contains a cationic polyamine-epichlorohydrin wet strength resin at a concentration of about 25 lb. per ton of dry fiber, and carboxymethyl cellulose at a concentration of about 6.5 lb. per ton of dry fiber.

Dewatering occurs through the Fourdrinier wire and is assisted by vacuum boxes. The wire is of a configuration having 84 machine direction and 78 cross direction filaments per inch, such as that available from Albany International known at 84×78-M.

The embryonic wet web is transferred from the Fourdrinier wire at a fiber consistency of about 22% at the point of transfer, to a TAD carrier fabric. The wire speed is about 6% faster than the carrier fabric so that wet shortening of the web occurs at the transfer point. The sheet side of the carrier fabric consists of a continuous, patterned network of photopolymer resin, said pattern containing about 330 deflection conduits per inch. The deflection conduits are arranged in a bi-axially staggered configuration, and the polymer network covers about 25% of the surface area of the carrier fabric. The polymer resin is supported by and attached to a woven support member consisting of 70 machine direction and 35 cross direction filaments per inch. The photopolymer network rises about 0.008" above the support member.

The consistency of the web is about 65% after the action of the TAD dryers operating about a 450 F, before transfer onto the Yankee dryer. An aqueous solution of creping adhesive consisting of polyvinyl alcohol is applied to the Yankee surface by spray applicators at a rate of about 5 lb. per ton of production. The Yankee dryer is operated at a speed of about 600 fpm. The fiber consistency is increased to an estimated 99% before creping the web with a doctor blade. The doctor blade has a bevel angle of about 25 degrees and is positioned with respect to the Yankee dryer to provide an impact angle of about 81 degrees. The Yankee dryer is operated at about 315° F., and Yankee hoods are operated at about 350° F.

The dry, creped web is passed between two calendar rolls operated at 540 fpm, so that there is net 6% foreshortening of the web by crepe. The resulting paper has a basis weight of about 24 grams per square meter (gsm).

The paper described above is then subjected to the deep embossing process of this invention. Two emboss rolls are engraved with complimentary, nesting protrusions shown in FIG. 2. The embossing pattern of FIG. 2 has 17 embossments per square inch, with each embossment having an area of 0.007854 square inches. The resulting e-factor is 0.0462 with an overall embossment of 13.3%. The positive subpatterns 22 are separated by a distance of 0.3996 inches. Said protrusions are frustaconical in shape, with a face diameter of about 0.100" and a floor diameter of about 0.172." The height of the protrusions on each roll is about 0.120." The engagement of the nested rolls is set to about 0.098," and the paper described above is fed through the engaged gap at a speed of about 120 fpm. The resulting paper has a embossment height of greater than 1000 μm, an Embossment Height to Loaded Caliper of greater than 1.45, an Initial Compressibility Ration of greater than 25.

Embodiment 2

In another preferred embodiment of the embossed tissue-towel paper products, two separate paper plies are made from the paper making process of Embodiment 1. The two plies are then combined and embossed together by the deep nested embossing process of Embodiment 1. The resulting paper has an embossment height of greater than 1000 μm, an Embossment Height to Loaded Caliper of greater than 1.45, an Initial Compressibility Ration of greater than 25, and an Absorbent Capacity of greater than about 21.3 gram per gram.

Embodiment 3

In another preferred embodiment of the embossed tissue-towel paper products, three separate paper plies are made from the paper making process of Embodiment 1. Two of the plies are deep nested embossed by the deep nested embossing process of the Embodiment 1. The three plies of tissue paper are then combined in a standard converting process such that the two embossed plies are the respective outer plies and the unembossed ply in the inner ply of the product. The resulting paper has a embossment height of greater than 1000 μm, an Embossment Height to Loaded Caliper of greater than 1.45, an Initial Compressibility Ration of greater than 25.

Embodiment 4

In a preferred example of a through-air dried, differential density structure described in U.S. Pat. No. 4,528,239 may be formed by the following process.

The TAD carrier fabric of Example 1 is replaced with a carrier fabric consisting of 225 bi-axially staggered deflection conduits per inch, and a resin height of about 0.012". This paper is further subjected to the embossing process of Example 1, and the resulting paper has a embossment height of greater than 1000 μm, an Embossment Height to Loaded Caliper of greater than 1.45, an Initial Compressibility Ration of greater than 25.

Embodiment 5

An alternative embodiment of the present fibrous structure is a paper structure having a wet microcontraction greater than about 5% in combination with any known through air dried process. Wet microcontraction is described in U.S. Pat. No. 4,440,597. An example of embodiment 5 may be produced by the following process.

The wire speed is increased compared to the TAD carrier fabric so that the wet web foreshortening is 10%. The TAD carrier fabric of Example 1 is replaced by a carrier fabric having a 5-shed weave, 36 machine direction filaments and 32 cross-direction filaments per inch. The net crepe for shortening is 20%. The resulting paper prior to embossing has a basis weight of about 22 lb/3000 square feet. This paper is further subjected to the embossing process of Example 1, and the resulting paper has a embossment height of greater than 1000 μm, an Embossment Height to Loaded Caliper of greater than 1.45, an Initial Compressibility Ration of greater than 25.

Embodiment 6

Another embodiment of the fibrous structure of the present invention is the through air dried paper structures having machine direction impression knuckles as described in U.S. Pat. No. 5,672,248. A commercially available single-ply substrate made according to U.S. Pat. No. 5,672,248 having a basis weight of about 25 lb/3000 square feet sold under the Trade-name Scott and manufactured by Kimberly Clark Corporation is subjected to the embossing process of Example 1. The resulting paper has an embossment height of greater than 1000 μm, an Embossment Height to Loaded Caliper of greater than 1.45, an Initial Compressibility Ration of greater than 25.

Test Methods

Basis Weight Method:

"Basis Weight" as used herein is the weight per unit area of a sample reported in lbs/3000 $ft^2$ or $g/m^2$. Basis weight is measured by preparing one or more samples of a certain area ($m^2$) and weighing the sample(s) of a fibrous structure according to the present invention and/or a paper product comprising such fibrous structure on a top loading balance with a minimum resolution of 0.01 g. The balance is protected from air drafts and other disturbances using a draft shield. Weights are recorded when the readings on the balance become constant. The average weight (g) is calculated and the average area of the samples ($m^2$). The basis weight ($g/m^2$) is calculated by dividing the average weight (g) by the average area of the samples ($m^2$).

Loaded Caliper Test:

"Loaded Caliper" as used herein means the macroscopic thickness of a sample. Caliper of a sample of fibrous structure according to the present invention is determined by cutting a sample of the fibrous structure such that it is larger in size than a load foot loading surface where the load foot loading surface has a circular surface area of about 3.14 $in^2$. The sample is confined between a horizontal flat surface and the load foot loading surface. The load foot loading surface applies a confining pressure to the sample of 14.7 $g/cm^2$ (about 0.21 psi). The caliper is the resulting gap between the flat surface and the load foot loading surface. Such measurements can be obtained on a VIR Electronic Thickness Tester Model II available from Thwing-Albert Instrument Company, Philadelphia, Pa. The caliper measurement is repeated and recorded at least five (5) times so that an average caliper can be calculated. The result is reported in millimeters, or thousandths of an inch (mils).

Density Method:

The density, as that term is used herein, of a fibrous structure in accordance with the present invention and/or a sanitary tissue product comprising a fibrous structure in accordance with the present invention, is the average ("apparent") density calculated. The density of tissue paper, as that term is used herein, is the average density calculated as the basis weight of that paper divided by the caliper, with the appropriate unit conversions incorporated therein. Caliper of the tissue paper, as used herein, is the thickness of the paper when subjected to a compressive load of 95 $g/in^2$. The density of tissue paper, as that term is used herein, is the average density calculated as the basis weight of that paper divided by the caliper, with the appropriate unit conversions incorporated therein. Caliper, as used herein, of a fibrous structure and/or sanitary tissue product is the thickness of the fibrous structure or sanitary tissue product comprising such fibrous structure when subjected to a compressive load of 14.7 $g/cm^2$.

Horizontal Full Sheet (HFS):

The Horizontal Full Sheet (HFS) test method determines the amount of distilled water absorbed and retained by the paper of the present invention. This method is performed by first weighing a sample of the paper to be tested (referred to herein as the "Dry Weight of the paper"), then thoroughly wetting the paper, draining the wetted paper in a horizontal position and then reweighing (referred to herein as "Wet Weight of the paper"). The absorptive capacity of the paper is then computed as the amount of water retained in units of grams of water absorbed by the paper. When evaluating different paper samples, the same size of paper is used for all samples tested.

The apparatus for determining the HFS capacity of paper comprises the following: An electronic balance with a sensitivity of at least ±0.01 grams and a minimum capacity of 1200 grams. The balance should be positioned on a balance table and slab to minimize the vibration effects of floor/benchtop weighing. The balance should also have a special balance pan to be able to handle the size of the paper tested (i.e.; a paper sample of about 11 in. (27.9 cm) by 11 in. (27.9 cm)). The balance pan can be made out of a variety of materials. Plexiglass is a common material used.

A sample support rack and sample support cover is also required. Both the rack and cover are comprised of a lightweight metal frame, strung with 0.012 in. (0.305 cm) diameter monofilament so as to form a grid of 0.5 inch squares (1.27 $cm^2$). The size of the support rack and cover is such that the sample size can be conveniently placed between the two.

The HFS test is performed in an environment maintained at 23±1° C. and 50±2% relative humidity. A water reservoir or tub is filled with distilled water at 23±1° C. to a depth of 3 inches (7.6 cm).

The paper to be tested is carefully weighed on the balance to the nearest 0.01 grams. The dry weight of the sample is reported to the nearest 0.01 grams. The empty sample support rack is placed on the balance with the special balance pan described above. The balance is then zeroed (tared). The sample is carefully placed on the sample support rack. The support rack cover is placed on top of the support rack. The sample (now sandwiched between the rack and cover) is submerged in the water reservoir. After the sample has been submerged for 60 seconds, the sample support rack and cover are gently raised out of the reservoir.

The sample, support rack and cover are allowed to drain horizontally for 120±5 seconds, taking care not to excessively shake or vibrate the sample. Next, the rack cover is carefully removed and the wet sample and the support rack are weighed on the previously tared balance. The weight is recorded to the nearest 0.01 g. This is the wet weight of the sample.

The gram per paper sample absorptive capacity of the sample is defined as (Wet Weight of the paper–Dry Weight of the paper). The Absorbent Capacity is defined as:

$$\text{Absorbent Capacity} = \frac{(\text{Wet Weight of the paper} - \text{Dry Weight of the paper})}{(\text{Dry Weight of the paper})}$$

and has a unit of gram/gram.

Embossment Height Test Method:

Embossment height is measured using a GFM Primos Optical Profiler instrument commercially available from GFMesstechnik GmbH, Warthestraβe 21, D14513 Teltow/Berlin, Germany. The GFM Primos Optical Profiler instrument includes a compact optical measuring sensor based on the digital micro mirror projection, consisting of the following main components: a) DMD projector with 1024×768 direct digital controlled micro mirrors, b) CCD camera with high resolution (1300×1000 pixels), c) projection optics adapted to a measuring area of at least 27×22 mm, and d) recording optics adapted to a measuring area of at least 27×22 mm; a table tripod based on a small hard stone plate; a cold light source; a measuring, control, and evaluation computer; measuring, control, and evaluation software ODSCAD 4.0, English version; and adjusting probes for lateral (x-y) and vertical (z) calibration.

The GFM Primos Optical Profiler system measures the surface height of a sample using the digital micro-mirror pattern projection technique. The result of the analysis is a map of surface height (z) vs. xy displacement. The system has a field of view of 27×22 mm with a resolution of 21 microns. The height resolution should be set to between 0.10 and 1.00 micron. The height range is 64,000 times the resolution.

To measure a fibrous structure sample do the following:

1. Turn on the cold light source. The settings on the cold light source should be 4 and C, which should give a reading of 3000K on the display;
2. Turn on the computer, monitor and printer and open the ODSCAD 4.0 Primos Software.
3. Select "Start Measurement" icon from the Primos taskbar and then click the "Live Pic" button.
4. Place a 30 mm by 30 mm sample of fibrous structure product conditioned at a temperature of 73° F.±2° F. (about 23° C.±1° C.) and a relative humidity of 50%±2% under the projection head and adjust the distance for best focus.
5. Click the "Pattern" button repeatedly to project one of several focusing patterns to aid in achieving the best focus (the software cross hair should align with the projected cross hair when optimal focus is achieved). Position the projection head to be normal to the sample surface.
6. Adjust image brightness by changing the aperture on the lens through the hole in the side of the projector head and/or altering the camera "gain" setting on the screen. Do not set the gain higher than 7 to control the amount of electronic noise. When the illumination is optimum, the red circle at bottom of the screen labeled "I.O." will turn green.
7. Select Technical Surface/Rough measurement type.
8. Click on the "Measure" button. This will freeze on the live image on the screen and, simultaneously, the image will be captured and digitized. It is important to keep the sample still during this time to avoid blurring of the captured image. The image will be captured in approximately 20 seconds.
9. If the image is satisfactory, save the image to a computer file with ".omc" extension. This will also save the camera image file ".kam".
10. To move the date into the analysis portion of the software, click on the clipboard/man icon.
11. Now, click on the icon "Draw Cutting Lines". Make sure active line is set to line 1.

Move the cross hairs to the lowest point on the left side of the computer screen image and click the mouse. Then move the cross hairs to the lowest point on the right side of the computer screen image on the current line and click the mouse. Now click on "Align" by marked points icon. Now click the mouse on the lowest point on this line, and then click the mouse on the highest point on this line. Click the "Vertical" distance icon. Record the distance measurement. Now increase the active line to the next line, and repeat the previous steps, do this until all lines have been measured (six (6) lines in total. Take the average of all recorded numbers, and if the units is not micrometers, convert it to micrometers (μm)). This number is the embossment height. Repeat this procedure for another image in the fibrous structure product sample and take the average of the embossment heights.

Initial Compressibility Ratio:

Caliper versus load data are obtained using a Thwing-Albert Model EJA Materials Tester, equipped with a 2000 g load cell and compression fixture. The compression fixture consisted of the following; load cell adaptor plate, 2000 gram overload protected load cell, load cell adaptor/foot mount 1.128 inch diameter presser foot, #89-14 anvil, 89-157 leveling plate, anvil mount, and a grip pin, all available from Thwing-Albert Instrument Company, Philadelphia, Pa. The compression foot is one square inch in area. The instrument is run under the control of Thwing-Albert Motion Analysis Presentation Software (MAP V1,1,6,9). A single sheet of a conditioned sample is cut to a diameter of approximately two inches. Samples are conditioned for a minimum of 2 hours at 73±2 F and 50±2% RH. Testing is carried out under the same temperature and humidity conditions. The sample must be less than 2.5-inch diameter (the diameter of the anvil) to prevent interference of the fixture with the sample. Care should be taken to avoid damage to the center portion of the sample, which will be under test. Scissors or other cutting tools may be used. For the test, the sample is centered on the compression table under the compression foot. The compression and relaxation data are obtained using a crosshead speed of 0.1 inches/minute. The deflection of the load cell is obtained by running the test without a sample being present. This is generally known as the Steel-to-Steel data. The Steel-to-Steel data are obtained at a crosshead speed of 0.005 in/min. Crosshead position and load cell data are recorded between the load cell range of 5 grams and 1500 grams for both the compression and relaxation portions of the test. Since the foot area is one square inch this corresponded to a range of 5 grams/sq in to 1500 grams/sq in. The maximum pressure exerted on the sample is 1500 g/sq in. At 1500 g/sq in the crosshead reverses its travel direction. Crosshead position values are collected at 31 selected load values during the test. These correspond to pressure values of 10, 25, 50, 75, 100, 125, 150, 200, 300, 400, 500, 600, 750, 1000, 1250, 1500, 1250, 1000, 750, 500, 400, 300, 250, 200, 150, 125, 100, 75, 50, 25, 10 g/sq. in. for the compression and the relaxation direction. During the compression portion of the test, crosshead position values are collected by the MAP software, by defining fifteen traps (Trap1 to Trap 15) at load settings of 10, 25, 50, 75, 100, 125, 150, 200, 300, 400, 500, 600, 750, 1000, 1250. During the return portion of the test, crosshead position values are collected by the MAP software, by defining fifteen return traps (Return_Trap1 to Return_Trap 15) at load settings of 1250, 1000, 750, 500, 400, 300, 250, 200, 150, 125, 100, 75, 50, 25, 10. The thirty-first trap is the trap at max load (1500 g). Again values are obtained for both the Steel-to-Steel and the sample. Steel-to-Steel values are obtained for each batch of testing. If multiple days are involved in the testing, the values are checked daily. The Steel-to-Steel values and the sample values are an average of four replicates (1500 g).

Caliper values are obtained by subtracting the average Steel-to-Steel crosshead trap values from the sample crosshead trap value at each trap point. For example, The values from the four individual replicates on each sample are averaged and used to obtain plots of the Caliper versus Load and Caliper versus Log(10) Load.

The Initial Compression Ratio is defined as the absolute value of the initial slope of the caliper versus Log(10)Load. The value is calculated by taking the first four data pairs from the compression direction of the curve that is, the caliper at 10, 25, 50, and 75 g/sq in at the start of the test. The pressure is converted to the Log(10) of the pressure. A least square regression is then obtained using the four pairs of caliper (y-axis) and Log(10) pressure (x-axis). The absolute value of the slope of the regression line is the Initial Compression Ratio. The units of the Initial Compression Ratio are mils/(log(10)g/sq in). For simplicity the Initial Compression Ratio is reported here without units.

All documents cited in the Detailed Description of the Invention are, are, in relevant part, incorporated herein by reference; the citation of any document is not to be construed as an admission that it is prior art with respect to the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An embossed tissue-towel paper product comprising one or more plies of tissue paper wherein at least one of the plies of tissue paper comprises a plurality of embossments wherein the at least one embossed plies have a total embossed area less than or equal to about 15% and an average embossment height of at least about 650 μm and E factor of between about 0.0150 to about 1.0000 $inches^4$ per number of embossments; wherein the plurality of embossments is in a non-random pattern of positive embossments and a corresponding non-random pattern of negative embossments; and wherein both the positive and negative patterns comprise at least one non-random curvilinear sub-pattern each comprising one or more embossments.

2. An embossed tissue-towel paper product according to claim 1 wherein the non-random curvilinear sub-pattern comprises a continuous element.

3. An embossed tissue-towel paper product according to claim 1 wherein the non-random curvilinear sub-pattern comprises a plurality of emboss elements.

4. An embossed tissue-towel paper product according to claim 1 further comprising an Embossment Height to Loaded Caliper Ratio of greater than about 1.45 and less than about 3.5.

5. An embossed tissue-towel paper product according to claim 4 wherein the Embossment Height to Loaded Caliper Ratio is greater than about 1.60 and less than about 3.00.

6. An embossed tissue-towel paper product according to claim 1 comprising one or more plies of tissue paper having an Initial Compression Ratio of greater than about 25.

7. An embossed tissue-towel paper product according to claim 6 wherein the Initial Compression Ratio is greater than about 30.

8. An embossed tissue-towel paper product according to claim 1 and having an Absorbent Capacity of greater than about 21.3 grams per gram.

9. An embossed tissue paper according to claim 1 wherein the average embossment height of the at least one embossed plies have an average embossment height of at least about 1000 μm.

10. An embossed tissue paper according to claim 9 wherein the average embossment height of the at least one embossed plies have an average embossment height of at least about 1250 μm.

11. An embossed tissue paper according to claim 9 wherein the average embossment height of the at least one embossed plies have an average embossment height of at least about 1400 μm.

12. An embossed tissue-towel paper product according to claim 1 comprising two or more plies of tissue paper.

13. An embossed tissue-towel paper product comprising one or more plies of tissue paper wherein at least one of the plies of tissue paper comprises a plurality of embossments wherein the at least one embossed plies have a total embossed area less than or equal to about 15% and an average embossment height of at least about 650 μm and E factor of between about 0.0150 to about 1.0000 $inches^4$ per number of embossments; wherein the plurality of embossments is in a non-random pattern of positive embossments and a corresponding non-random pattern of negative embossments; and wherein more than one corresponding positive sub-patterns within the non-random patterns of positive embossment wherein the distance between positive sub-patterns is greater than or equal to about 0.25 inch and less than about 1.00 inch.

14. An embossed tissue-towel paper product according to claim 13 wherein the distance between positive sub-patterns is greater than or equal to 0.3 inch.

15. An embossed tissue-towel paper product according to claim 13 wherein the distance between positive sub-patterns is less than or equal to 0.75 inch.

16. An embossed tissue-towel paper product according to claim 13 wherein a negative sub-pattern is located between the two positive sub-patterns.

* * * * *

UNITED STATES PATENT AND TRADEMARK OFFICE

CERTIFICATE OF CORRECTION

PATENT NO. : 7,311,800 B2

APPLICATION NO. : 11/059986

DATED : December 25, 2007

INVENTOR(S) : Russell et al.

It is certified that error appears in the above-identified patent and that said Letters Patent is hereby corrected as shown below:

In Col. II, lines 55-56, "for shortening" should be foreshortening

Signed and Sealed this

Thirteenth Day of May, 2008

JON W. DUDAS

*Director of the United States Patent and Trademark Office*